United States Patent Office 3,128,318
Patented Apr. 7, 1964

3,128,318
ALKALI METAL AMIDE CATALYSTS AND THEIR USE IN POLYMERIZING OLEFINS
Erwin E. Meisinger, Elmhurst, and Herman S. Bloch, Skokie, Ill., assignors to Universal Oil Products Company, Des Plaines, Ill., a corporation of Delaware
No Drawing. Filed June 18, 1962, Ser. No. 203,006
15 Claims. (Cl. 260—683.15)

This application is a continuation-in-part of our copending application Serial No. 847,054, filed October 19, 1959, now abandoned.

This invention relates to a method for the conversion of organic compounds and particularly to a method for the conversion of olefinic hydrocarbons. More particularly yet the invention is concerned with a process for polymerizing an olefinic hydrocarbon in the presence of a novel catalyst.

The need for crude rubber, either natural or synthetic has increased at a tremendous rate inasmuch as rubber has attained a position of great importance as a material of modern manufacture, said importance being due to the diverse uses to which it may be put. Heretofore in past years the amount of rubber which may be obtained naturally from rubber trees has been sufficient to satisfy the requirements of modern living. However, the sources of natural rubber may be made unattainable to many countries due to emergencies which may arise. This condition was made apparent during the last war when many sources of natural rubber in the Far East, such as Southeast Asia, were cut off from the Western Hemisphere. When situations such as this arise, substitutes must be found to take the place of the missing natural rubber. Heretofore, synthetic rubbers such as the types produced by the reaction of butadiene and styrene (GR–S), butadiene and acrylonitrile (Buna-N), butadiene and isobutylene, Thiokol rubber, silicone rubber, neoprene rubber, etc., have been prepared. However, these products have usually been inferior to natural rubber in many of the necessary properties when in the vulcanized, elastic state.

It has now been discovered that a diolefinic hydrocarbon such as isoprene may be caused to polymerize stereoselectively to a rubbery product similar in many respects to the natural Hevea type rubber. The uses of such a rubber in articles of manufacture are many and varied, being too numerous to list in their entirety. A few representative uses are, for example, raw rubber which may be used in the shoe industry for the production of crepe soles for shoes, for erasers, adhesive cements and in the fabrication of gummed fabrics such as, for example, rubber cloaks; vulcanized rubber products which will include bumpers, buffers, vehicle tires, shock- and soundproof articles, rubber bands, stoppers, stamps, sponges, elastic thread, belts, packing materials for machine construction, installation, etc.; and hard rubber which may be used as a suitable material for combs, tubing, fountain pens, etc.

Therefore, as hereinbefore set forth, the need for a diolefinic hydrocarbon such as isoprene is greatly magnified, said compound assuming a greater importance than heretofore known for the production of such a rubber as the hereinabove mentioned Hevea type.

It has now been discovered that unsaturated organic compounds such as olefinic hydrocarbons and, particularly, propylene may be selectively converted in the presence of a novel catalyst hereinafter set forth to form a dimer of propylene, namely, 2-methyl-2-pentene, which is an intermediate in the preparation of isoprene, the final product being obtained by the demethylation of the propylene dimer.

It is therefore an object of this invention to provide a process for the conversion of organic compounds using a novel catalyst therefore.

Another object of this invention is to provide a novel catalyst which will selectively convert olefinic hydrocarbons to preferred polymers thereof.

A specific object of this invention is to provide a novel method and a novel catalyst for selectively polymerizing certain olefinic hydrocarbons to provide a desired dimer of the olefinic hydrocarbon.

Taken in its broadest aspect one embodiment of this invention resides in a process for the conversion of a monoolefinic hydrocarbon which comprises polymerizing said hydrocarbon at polymerization conditions in the presence of a catalyst comprising an alkali metal amide disposed on a promoted high surface area alumina support.

A further embodiment of this invention is found in a process for the conversion of a monoolefinic hydrocarbon which comprises polymerizing said hydrocarbon at polymerization conditions in the presence of a catalyst comprising an alkali metal amide disposed on a promoted substantially anhydrous alumina having a surface area of from about 50 to about 500 square meters per gram.

Yet another embodiment of this invention is found in a process for the conversion of propylene which comprises polymerizing propylene at a temperature in the range of from about 50° to about 300° C. and at a pressure in the range of from about 5 to about 250 atmospheres in the presence of a catalyst comprising an alkali metal amide disposed on a promoted high surface area substantially anhydrous alumina support to form 2-methyl-2-pentene.

Still another embodiment of this invention resides in a conversion catalyst comprising an alkali metal amide disposed on a promoted high surface area substantially anhydrous alumina support.

A specific embodiment of this invention is found in a process for the conversion of propylene which comprises polymerizing said propylene at a temperature in the range of from about 50° to about 300° C. and at a pressure in the range of from about 5 to about 250 atmospheres in the presence of a catalyst comprising potassium amide disposed on a promoted substantially anhydrous gamma-alumina support to form 2-methyl-2-pentene.

Another specific embodiment of this invention is found in a conversion catalyst comprising potassium amide disposed on a substantially anhydrous gamma-alumina which has been impregnated with lithium hydroxide and thereafter calcined.

Other objects and embodiments referring to alternative alkali metal amides, promoted metal oxide supports and unsaturated organic compounds will be found in the following further detailed description of this invention.

Certain catalytic compositions of matter have been utilized in the conversion of hydrocarbons and particularly olefinic hydrocarbons, said catalytic compositions of matter including alkali metals per se or in conjunction with a support such as adsorbent carbon. In addition, another use of an alkali metal catalyst, as shown in the prior art, is for removal of contaminants from diolefinic hydrocarbons. For example, acetylenic hydrocarbons or oxygenated compounds may be removed from diolefinic hydrocarbons by the use of alkali metals or hydrides thereof in finely divided form and without a support or carrier. However the prior art teaches that when these types of compounds are used the loss of valuable hydrocarbons due to side reactions or to polymerization is very markedly reduced or almost entirely eliminated. In contradistinction to this it has now been discovered that by utilizing a catalytic composition of matter of the type hereinafter more fully set forth, namely, an alkali metal amide disposed on a promoted metal oxide support, a totally unexpected reaction will occur as will be hereinafter shown in greater detail. The totally unexpected reaction is the formation of a preferred isomer when utilizing said catalyst in a selective polymerization reaction, a specific example of this being the production of a preferred isomer such as 2-methyl-2-pentene in a relatively greater yield than would be expected under normal equilibrium conditions.

Unsaturated organic compounds and particularly olefinic hydrocarbons which may be condensed (the terms "condensed" and "condensation" as used herein in the specification and appended claims will be defined as, but not limited to, "polymerized" and "polymerization," and may also include alkylation) by heating in the presence of a novel catalyst of the type hereinafter more fully described include monoolefins such as ethylene, propylene, 1-butene, 2-butene, 1-pentene, 2-pentene, 1-hexene, 2-hexene, 3-hexene, 1-heptene, 2-heptene, etc., polyolefins such as 1,3-butadiene, 1,3-pentadiene, 1,4-pentadiene, 1,3-hexadiene, 1,4-hexadiene, etc.; cyclic olefins such as cyclopentene, cyclohexene, cycloheptene, etc.

In addition it is also contemplated within the scope of this invention that besides the aforementioned olefins which may be condensed by themselves, other olefins of the types hereinbefore listed may be condensed with a dissimilar olefin although not necessarily with equivalent results. In addition to the condensation of the aforementioned olefins, the catalyst composition hereinafter described may be used as a catalyst for the side chain alkylation of alkaryl compounds, and in particular alkyl aromatic hydrocarbons which contain at least one replaceable hydrogen atom on the $\alpha$-carbon atom in the side chain, such compounds including toluene, o-xylene, m-xylene, p-xylene, ethylbenzene, propylbenzene, isopropylbenzene, butylbenzene, the diethylbenzenes, the dipropylbenzenes, etc., the aforementioned olefinic hydrocarbons, or compounds capable of forming olefinic hydrocarbons under the conditions at which the reaction proceeds, being used as the alkylation agents. Furthermore, the catalyst composition will act as an isomerization catalyst, shifting the double bond of unsaturated hydrocarbons, such as butene-1 or propylene dimer, to a more centralized position in the chain.

As hereinbefore set forth, the conversion process of the present invention is effected in the presence of an alkali metal amide disposed on a promoted metal oxide support. The term "promoted," as used hereinbefore and hereinafter in the specification and also in the appended claims, will refer to a pretreatment of the metal oxide support with a salt or hydroxide of a metal selected from the group including alkali metals and alkaline earth metals such as lithium, sodium, potassium, rubidium, cesium, magnesium, calcium, strontium and barium. Of the alkali metal amides which are composited or disposed on the promoted metal oxide support, potassium and sodium are preferred inasmuch as said metals exhibit substantially more activity than do other metals of the alkinous metal group (i.e., the group comprising alkali metals and alkaline earth metals) and potassium is especially preferred for the same aforesaid reason. In addition to their high activity, these two metals are preferred from an economic standpoint inasmuch as said metals are relatively more plentiful and correspondingly less expensive to use.

In preparing such catalysts, the alkali metal amides are disposed on a support in a quantity ranging from about 2 to about 20% or more by weight based on the support. The preferred supports which are utilized in the process of the present invention are those which are relatively or substantially free from water. In most cases, this freedom from water of the support is achieved by a precalcination treatment of said support. This precalcination is carried out at a relatively high temperature in the range of from about 400° to about 700° C. and for a time sufficient to effect substantial removal of adsorbed or combined water from the support. The time required will vary depending upon the support, and in addition depending upon whether the water is in a combined or in merely a physically adsorbed form. In addition to the necessity for freedom from water, the support is characterized by the necessity for having a high surface area. By the term high surface area is meant a surface area measured by surface adsorption techniques within the range of from about 25 to about 500 or more square meters per gram and preferably a support having a surface area of approximately 100 to 300 square meters per gram. For example, it has been found that certain low surface area supports such as alpha-alumina which is obviously free from combined water and which has been freed from adsorbed water is not a satisfactory support for the alkali metal amides in the preparation of catalysts for use in the process of this invention. Alpha-alumina is usually characterized by a surface area ranging from about 10 to about 25 square meters per gram. In contrast, gamma-alumina which has a surface area ranging from about 100 to about 300 square meters per gram, and which has been freed from adsorbed water and which contains little combined water, is a satisfactory support. Celite, a naturally occurring mineral, after precalcination, is not a satisfactory support. Celite has a surface area of from about 2 to about 10 square meters per gram. Likewise alkali metal amide dispersions on sand or on other low surface area silica are not satisfactory catalysts in this process. In addition, aluminas which contain combined water but which have relatively high surface areas are also not satisfactory supports. Such aluminas include dried alumina monohydrates which have not been sufficiently calcined to remove combined water and to form gamma-alumina. These alumina hydrates may have surface areas ranging from 50 to about 200 square meters per gram but because they contain combined water are not satisfactory supports. Particularly preferred supports for the preparation of catalysts for use in the process of this invention include high surface area crystalline alumina modifications such as gamma, eta- and theta-alumina, although these are not necessarily of equivalent suitability. However, as is obvious from the above discussion the limitation on the use of any particular support is one of freedom from combined or adsorbed water in combination with the surface area of the support selected. In addition to the aforementioned types of support another type is that which is prepared from an alkali aluminate such as sodium aluminate, potassium aluminate, etc., from which a substantial majority of the alkali metal has been removed leaving only the alumina with a relatively minor amount of the alkali metal present.

The desired support, preferably, although not necessarily, gamma-, eta- or theta-alumina is pretreated with a promoter in any manner. One method of impregnating the solid support is to treat said support with an alkali metal hydroxide such as lithium hydroxide, potassium hydroxide, sodium hydroxide, etc., and thereafter calcine at a temperature, usually in the range of from about 500° to about 700° C. whereby said hydroxide is thoroughly dehydrated.

The novel catalyst of the present invention is then prepared by dissolving an alkali metal such as potassium in liquid ammonia and impregnating the promoted alumina with an ammonia solution of potassium amide, the potassium amide having been formed when the potassium reacted with the ammonia. Following this impregnation by the alkali metal amide in the ammonia the excess ammonia is driven off and the catalyst is then ready for use in the desired conversion reaction. Examples of alkali metal amides which may be utilized include potassium amide, sodamide, lithium amide, rubidium amide, cesium amide, the preferred amides comprising sodamide and potassium amide due to the relatively large amount of these metals available and the correspondingly lower cost of the same.

The process of the present invention may be effected in any suitable manner and may comprise either a batch or continuous type operation. One example of a batch type operation which may be used is the conversion of an olefinic hydrocarbon to a polymer thereof. A quantity of the unsaturated organic compound such as an olefinic hydrocarbon, a particular example of which is propylene, is placed in an appropriate apparatus such as a condensation flask or, if higher temperatures and pressures are to be used, in a rotating autoclave. The particular apparatus which has been selected will contain the conversion catalyst of the type hereinbefore set forth comprising an alkali metal amide disposed on a promoted metal oxide support. If so desired a substantially inert organic diluent may also be used, said diluent including aromatic hydrocarbons which contain no alkyl substituents with α-hydrogen, such as benzene, naphthalene, pyrene, etc., or paraffinic and cylcoparaffinic hydrocarbons such as n-pentane, n-hexane, n-heptane, cyclopentane, methylcyclopentane, ethylcyclopentane, methylcyclohexane, etc. The apparatus and contents thereof are then heated to the desired reaction temperature and maintained thereat for a predetermined period of time. If higher than self-generated pressures are to be used, an inert gas such as nitrogen may be pressed in until the desired pressure has been reached. At the end of the reaction period, the desired product is separated from the catalyst and recovered by conventional means such as fractional distillation, crystallization, etc.

The process of this invention may also be effected in a continuous type operation, the catalyst comprising an alkali metal amide disposed on a promoted metal oxide support being particularly suitable for use in a fixed bed type of operation. When this method is used the catalyst is disposed as a fixed bed in a reaction zone maintained at the proper operating conditions while the olefinic hydrocarbon and solvent, if one is desired, are continuously charged thereto through separate lines. Alternatively, the olefinic hydrocarbon and the organic solvent or diluent may be admixed prior to entry into said reactor and charged thereto in a single stream. In carrying out the process of this invention in a continuous manner liquid hourly space velocities (the volume of liquid hydrocarbon charged to the reactor per volume of catalyst per hour) may be varied within a relatively wide range of from about 0.1 to about 20 or more, the preferred range being from about 0.1 to about 10. The desired reaction product is continuously withdrawn from the reaction zone, separated from the reactor effluent and purified by conventional means while said remaining effluent may be recharged at least in part to the reaction zone as a portion of the feed material.

Other continuous types of operation which may be used in this process include the compact moving bed type of operation in which the bed of catalysts and the reactants pass either concurrently or countercurrently to each other in the reaction zone, and the slurry type operation in which the catalyst is carried into the reaction zone as a slurry in one of the reactants.

The process of this invention is preferably effected at elevated temperatures and pressures, the temperature being in the range of from about 50° to about 300° C. or more. Generally speaking the pressure at which this process operates will be dependent upon the particular organic compound or compounds undergoing conversion and the particular catalyst which is used in the process, said pressure being sufficient to maintain a substantial portion of the hydrocarbons in the liquid phase, said pressure being in the range of from about 5 to about 250 atmospheres or more.

The following examples are given to illustrate the process of the present invention invention which, however, are not intended to limit the generally broad scope of the present invention in strict accordance therewith.

EXAMPLE I

A conversion catalyst was prepared by condensing 300 cc. of ammonia gas in a 500 ml. flask along with 0.2 g. of calcined ferric oxide as a promoter. The flask was maintained at the reflux temperature of ammonia and potassium was slowly added to the flask in small increments. When the reaction of the potassium with the liquid ammonia to form potassium amide was completed, as evidenced by the disappearance of the blue color of the solution, 50 cc. of alumina which had previously been treated with lithium hydroxide was added. The alumina was prepared by calcining approximately 500 cc. of halide-free alumina spheres for a period of four hours at 550° C. Following this the spheres were stored in a desiccator; then fifty cc. of the spheres were impregnated with lithium hydroxide solution equal to 0.5 weight percent of the alumina, and then calcined for an additional two hours at 550° C. After the lithiated or promoted alumina was impregnated with potassium amide, the excess ammonia was removed by evaporating the mixture while continuously stirring the same. Following the evaporation of the ammonia gas the catalyst was flushed with dried nitrogen and transferred to the reactor. This catalyst was designated by the letter "A."

EXAMPLE II

Fifty cc. of halide-free alumina spheres that had been calcined for four hours at 550° C. prior to use were again calcined for two hours at this same temperature. The potassium amide described in Example I above was prepared by condensing approximately 300 cc. of ammonia gas in a 500 cc. flask using 0.2 g. of calcined ferric oxide as a promoter. Potassium was slowly added in small increments while the ammonia was maintained at the reflux temperature thereof. When the reaction of the potassium was completed the flask was cooled and 50 cc. of alumina spheres were added thereto. The mixture was then evaporated with constant stirring, flushed with dried nitrogen gas and transferred to the reactor which was used in the conversion of propylene to the dimer thereof. This catalyst was designated by the letter "B."

EXAMPLE III

Fifty cc. of precalcined halide-free alumina spheres were again calcined at a temperature of about 550° C. for a period of two hours and treated with lithium hydroxide solution equal to 0.5 weight percent of the alumina, following which the material was once more calcined at 550° C. for two hours. The lithiated or promoted alumina base was transferred, while still hot, to a 300 cc. Florence flask provided with spiral grooves and a thermometer well, following which potassium metal was added to the flask. The flask was heated until the potassium metal began to melt, the maximum temperature during the reaction rising to approximately 90°–100° C. When the reaction was complete, the flask was allowed to cool to room temperature and flushed with predried nitrogen. This catalyst was designated by the letter "C."

EXAMPLE IV

The three catalysts which were prepared according to the above examples were then used to polymerize a propylene-butane mixture.

The reactor comprised a 48" long stainless steel tube of 1" inner diameter with an 18" spiral preheater. The tube contained a 5" catalyst bed which contained approximately 50 cc. of catalyst. The tube was filled with catalyst under a nitrogen flow and sealed. Following this the tube was wrapped with heating tapes and insulated. The system was then pressured with dried nitrogen following which the charge of stock comprising a mixture of 50% of propylene and 50% of n-butane was pumped to the top of the reactor. The polymerization of the propylene was effected at a temperature ranging from about 200° to about 220° C., a pressure of about 55–60 atmospheres and a liquid hourly space velocity of 2. The discharge from the reactor was passed to a back pressure regulator which reduced the pressure to atmospheric pressure and thence into a heated distilling flask. A cold finger stabilizer separated the liquid from the unreacted gases which were condensed into a series of 2 traps containing Dry Ice-acetone. Any uncondensed gases which resulted from the polymerization were passed through a wet test meter. The weighed liquid product from the stabilizer was added to the Dry Ice-acetone trap and analyzed.

A line-out period of one and a half hours, during which product was discarded, initiated each test. Following this period, product was collected for a four hour test period. The results of these tests are set forth in Table I below.

*Table I*

| Catalyst Designation | A | B | C |
|---|---|---|---|
| Catalyst Description | $KNH_2$ on Lithiated $Al_2O_3$ | $KNH_2$ on Unpromoted $Al_2O_3$ | K on Lithiated $Al_2O_3$ |
| Wt. percent K in Catalyst | 20.0 | 20.2 | 20.2 |
| Temp., Max., ° C. | 206 | 208 | 203 |
| Wt. percent $C_3H_6$ Reacted | 33.3 | 18.8 | 17.6 |
| Wt. percent Hexenes Produced | 24.8 | 14.6 | 13.0 |
| Wt. percent Product Higher-boiling than Hexenes | 6.7 | 3.8 | 3.0 |
| Wt. percent 2-Methylpentene-2 in Hexene Fraction | 57.4 | 55.3 | 52.0 |

It will be noted that the potassium amide on lithia-promoted alumina was approximately twice as active as the amide on unpromoted alumina or as potassium metal on promoted alumina.

As it will be further noted, a major portion of the polymerized propylene comprised the dimers of propylene, the higher-boiling material being predominantly the trimers. Furthermore, it is noted that a major portion of the $C_6$ olefins produced comprised the desired 2-methyl-2-pentene. If so desired, the propylene dimer may be charged to a second reactor also provided with the novel catalyst composition of the present invention wherein separated $C_6$ olefins other than the desired 2-methylpentene-2 will be isomerized to form the desired product.

EXAMPLE V

In this example propylene was processed over a three-component catalyst for an extended period of time, namely, approximately 1150 hours to illustrate the stability of the catalyst, determine the effect of operating variables, and determine the retention of the activity of the catalyst to dimerize propylene. The following table illustrates the ability of the potassium amide on a promoted or lithiated alumina to dimerize propylene for prolonged periods whereby a preferred isomer, namely, 2-methyl-2-pentene is obtained.

A catalyst which comprised approximately 19.3% potassium amide calculated as potassium on lithiated or promoted alumina was prepared in a manner similar to that set forth in the above Example I. One hundred cc. of this catalyst was charged to the reactor under a dry nitrogen atmosphere. Normal pentane charge was used to fill the reactor liquid full and to bring the plant pressure up to 140 atmospheres. The pentane charge rate was established at 75 grams per hour following which the propylene charge which had a purity of 99.8 mol percent was introduced at the rate of 43 grams per hour. The reaction was effected at temperatures ranging from about 130° to about 170° C. The product was recovered and the composition was determined by gas liquid chromatography and by mass spectrometer analysis. The results of this test are shown in Table II below.

*Table II*

| Period Number | LHSV (100 cc. Catalyst) | | | Mol Ratio, $C_5:C_3=$ | Max. Cat. Temp. ° C. | Conv. Results | | |
|---|---|---|---|---|---|---|---|---|
| | $C_3=$ | $nC_5$ | Total Charge | | | $C_3=$ Conv., Wt. Percent | $C_6$ Olef., $C_6$, Wt. Percent | Percent of 2-methyl-2-pentene in hexene fraction |
| 1 | 0.85 | 1.15 | 2.0 | 1:1 | 143 | 44.0 | 92.3 | 70.0 |
| 2 | 0.85 | 1.15 | 2.0 | 1:1 | 140 | 43.2 | 94.0 | 69.1 |
| 3 | 0.85 | 1.15 | 2.0 | 1:1 | 134 | 35.4 | 94.0 | 71.9 |
| 4 | 0.85 | 1.15 | 2.0 | 1:1 | 133 | 27.9 | 95.3 | 72.6 |
| 5 | 0.85 | 1.15 | 2.0 | 1:1 | 130 | 25.2 | 90.9 | 76.0 |
| 6 | 0.85 | 1.15 | 2.0 | 1:1 | 152 | 46.1 | 94.8 | 65.6 |
| 7 | 0.85 | 1.15 | 2.0 | 1:1 | 153 | 44.3 | 95.9 | 66.8 |
| 8 | 0.85 | 1.15 | 2.0 | 1:1 | 152 | 41.7 | 95.3 | 69.7 |
| 9 | 1.7 | 2.3 | 4.0 | 1:1 | 152 | 24.4 | 96.8 | 65.8 |
| 10 | 1.7 | 2.3 | 4.0 | 1:1 | 152 | 22.7 | 96.9 | 67.6 |
| 11 | 0.42 | 2.30 | 2.72 | 4:1 | 137 | 20.7 | 92.8 | 70.4 |
| 12 | 0.42 | 2.30 | 2.72 | 4:1 | 145 | 28.8 | 93.0 | 68.6 |
| 13 | 0.42 | 1.15 | 1.57 | 2:1 | 146 | 43.9 | 93.4 | 65.0 |
| 14 | 0.68 | 2.04 | 2.72 | 2:1 | 146 | 29.1 | 93.1 | 78.6 |
| 15 | 1.10 | 1.62 | 2.27 | 1:1 | 152 | 32.0 | 96.4 | 67.9 |
| 16 | 1.7 | 2.3 | 4.0 | 1:1 | 153 | 23.0 | 96.6 | 63.9 |
| 17 | 1.7 | 2.3 | 4.0 | 1:1 | 149 | 18.0 | 98.2 | 66.3 |
| 18 | 1.7 | 2.3 | 4.0 | 1:1 | 152 | 18.6 | 97.7 | 67.0 |
| 19 | 1.06 | 2.94 | 4.0 | 2:1 | 152 | 22.5 | 96.9 | 66.7 |
| 20 | 0.42 | 0.58 | 1.00 | 1:1 | 153 | 63.5 | 94.7 | 66.5 |
| 21 | 0.28 | 0.72 | | 2:1 | 152 | 63.4 | 94.1 | 69.0 |
| 22 | 1.06 | 2.94 | 4.0 | | 168 | 31.0 | 97.1 | 65.7 |
| 23 | 0.53 | 1.47 | 2.0 | | 168 | 49.0 | 95.2 | 66.4 |
| 24 | 0.28 | 0.72 | 1.0 | | 167 | 72.7 | 92.8 | 65.2 |

It will be noted from the above table that the catalyst maintained its activity for a relatively long period of time in the test run with a correspondingly high degree of dimer formation, and particularly production of 2-methyl-2-pentene, this isomer being preferred inasmuch, as hereinbefore set forth, it constitutes a preferred intermediate for the production of isoprene. Comparable tests using other types of catalyst have disclosed the fact that the use of other catalysts will not result in the formation of relatively large amounts of 2-methyl-2-pentene and therefore, if it is desired to produce isoprene, a further step, namely, isomerization will be required before cracking the dimer to form isoprene.

We claim as our invention:

1. A process for the conversion of a monoolefinic hydrocarbon which comprises polymerizing said hydrocarbon at polymerization conditions in the presence of a catalyst comprising an alkali metal amide disposed on a high surface area substantially anhydrous alumina support which has been promoted with a hydroxide of a metal selected from the group consisting of the alkali metals and alkaline earth metals and calcined.

2. A process for the conversion of a monoolefinic hydrocarbon which comprises polymerizing said hydrocarbon at polymerization conditions in the presence of a catalyst comprising an alkali metal amide disposed on a high surface area substantially anhydrous alumina support which has been impregnated with an alkali metal hydroxide and thereafter calcined.

3. A process for the conversion of a monoolefinic hydrocarbon which comprises polymerizing said hydrocarbon at a temperature in the range of from about 50° to about 300° C. and at a pressure in the range of from about 5 to about 250 atmospheres in the presence of a catalyst comprising an alkali metal amide disposed on a high surface area substantially anhydrous alumina support which has been impregnated with an alkali metal hydroxide and thereafter calcined.

4. A process for the conversion of a monoolefinic hydrocarbon which comprises polymerizing said hydrocarbon at polymerization conditions in the presence of a catalyst comprising an alkali metal amide disposed on a substantially anhydrous alumina having a surface area of from about 50 to about 500 square meters per gram and which has been impregnated with an alkali metal hydroxide and thereafter calcined.

5. A process for the conversion of a monoolefinic hydrocarbon with comprises polymerizing said hydrocarbon at polymerization conditions in the presence of a catalyst comprising potassium amide disposed on a substantially anhydrous alumina having a surface area of from about 50 to about 500 square meters per gram and which has been impregnated with an alkali metal hydroxide and thereafter calcined.

6. A process for the conversion of a monoolefinic hydrocarbon which comprises polymerizing said hydrocarbon at polymerization conditions in the presence of a catalyst comprising potassium amide disposed on a substantially anhydrous gamma-alumina support which has been impregnated with an alkali metal hydroxide and thereafter calcined.

7. A process for the conversion of propylene which comprises polymerizing propylene at a temperature in the range of from about 50° to about 300° C. and at a pressure in the range of from about 5 to about 250 atmospheres in the presence of a catalyst comprising an alkali metal amide disposed on a high surface area substantially anhydrous alumina support which has been impregnated with an alkali metal hydroxide and thereafter calcined.

8. A process for the conversion of propylene which comprises polymerizing said propylene at a temperature in the range of from about 50° to about 300° C. and at a pressure in the range of from about 5 to about 250 atmospheres in the presence of a catalyst comprising potassium amide disposed on a substantially anhydrous gamma-alumina support which has been impregnated with an alkali metal hydroxide and thereafter calcined.

9. A conversion catalyst comprising an alkali metal amide disposed on a high surface area substantially anhydrous alumina support which has been promoted with a hydroxide of a metal selected from the group consisting of the alkali metals and alkaline earth metals and calcined.

10. A conversion catalyst comprising an alkali metal amide disposed on a substantially anhydrous alumina support having a surface area of from about 50 to about 500 square meters per gram and which has been impregnated with an alkali metal hydroxide and thereafter calcined.

11. A conversion catalyst comprising an alkali metal amide disposed on a substantially anhydrous gamma-alumina having a surface area of from about 50 to about 500 square meters per gram and which has been impregnated with an alkali metal hydroxide and thereafter calcined.

12. A conversion catalyst comprising potassium amide disposed on a substantially anhydrous gamma-alumina having a surface area of from about 50 to about 500 square meters per gram and which has been impregnated with an alkali metal hydroxide and thereafter calcined.

13. A conversion catalyst comprising potassium amide disposed on a substantially anhydrous gamma-alumina which has been impregnated with lithium hydroxide and thereafter calcined.

14. Process of claim 2 in which said hydroxide is lithium hydroxide.

15. A process for the conversion of a monoolefinic hydrocarbon which comprises polymerizing said hydrocarbon at polymerization conditions in the presence of a catalyst comprising an alkali metal amide disposed on a substantially anhydrous gamma-alumina support which has been promoted with an alkali metal hydroxide and calcined.

References Cited in the file of this patent

UNITED STATES PATENTS

| | | |
|---|---|---|
| 1,159,365 | De John | Nov. 9, 1915 |
| 1,737,953 | Urfer | Dec. 3, 1929 |
| 2,881,234 | Esmay et al. | Apr. 7, 1959 |